US012782556B2

(12) United States Patent
Gebhart et al.

(10) Patent No.: US 12,782,556 B2
(45) Date of Patent: Nov. 3, 2026

(54) ULTRASONIC TRANSDUCER AND METHOD FOR PRODUCING AN ULTRASONIC TRANSDUCER

(71) Applicant: TDK Electronics AG, Munich (DE)

(72) Inventors: Michael Gebhart, Linz (AT); Martina Kreuzbichler, Graz (AT); Amira Hedhili, Graz (AT); Peter Lukan, Deutschlandsberg (AT)

(73) Assignee: TDK Electronics AG, Munich (DE)

( * ) Notice: Subject to any disclaimer, the term of this patent is extended or adjusted under 35 U.S.C. 154(b) by 10 days.

(21) Appl. No.: 17/616,055

(22) PCT Filed: May 29, 2020

(86) PCT No.: PCT/EP2020/065069

§ 371 (c)(1),
(2) Date: Dec. 2, 2021

(87) PCT Pub. No.: WO2020/245064

PCT Pub. Date: Dec. 10, 2020

(65) Prior Publication Data

US 2022/0260712 A1 Aug. 18, 2022

(30) Foreign Application Priority Data

Jun. 4, 2019 (DE) ..................... 10 2019 115 032.9
Oct. 10, 2019 (AT) .............................. A 50182/2019

(51) Int. Cl.
*G01S 15/32* (2006.01)
*G01S 7/52* (2006.01)
(Continued)

(52) U.S. Cl.
CPC .......... *G01S 15/32* (2013.01); *G01S 7/52006* (2013.01); *G01S 7/521* (2013.01); *G01S 7/523* (2013.01); *G01S 15/93* (2013.01)

(58) Field of Classification Search
CPC ...... G01S 15/93; G01S 7/52006; G01S 15/32; G01S 7/521; G01S 7/523; B06B 1/06
(Continued)

(56) References Cited

U.S. PATENT DOCUMENTS 4,658,386 A * 4/1987 Morris .................. A01M 29/18 340/573.2
5,038,612 A * 8/1991 Thelen .................... G01S 7/521 73/632
(Continued)

FOREIGN PATENT DOCUMENTS

CN 103292893 A * 9/2013
CN 104285132 A 1/2015
(Continued)

OTHER PUBLICATIONS

WO-2016104415-A1 (attached machine translation) (Year: 2016).*
(Continued)

*Primary Examiner* — Yuqing Xiao
*Assistant Examiner* — Christopher Richard Walker
(74) *Attorney, Agent, or Firm* — Slater Matsil, LLP

(57) ABSTRACT

In an embodiment an ultrasonic transducer includes a container having an opening, a base and a wall, a piezoelectric disk arranged within the container on the base, a cover closing the container and an electronics system integrated in the cover, wherein the electronics system makes electrical contact with the piezoelectric disk and is configured to control and to read the piezoelectric disk.

43 Claims, 6 Drawing Sheets

(51) Int. Cl.
*G01S 7/521* (2006.01)
*G01S 7/523* (2006.01)
*G01S 15/93* (2020.01)

(58) Field of Classification Search
USPC ........................................... 702/196; 367/100
See application file for complete search history.

(56) References Cited

U.S. PATENT DOCUMENTS

| | | | | |
|---|---|---|---|---|
| 5,421,203 | A * | 6/1995 | Graff | B06B 1/04 73/643 |
| 8,897,025 | B2 | 11/2014 | Urase et al. | |
| 10,644,462 | B2 | 5/2020 | Shimizu et al. | |
| 2007/0017807 | A1 * | 1/2007 | Korthals | G10K 9/22 204/429 |
| 2008/0047350 | A1 * | 2/2008 | Atlas | G01S 15/08 73/625 |
| 2010/0054084 | A1 * | 3/2010 | Boucher | G01S 7/521 367/118 |
| 2010/0268503 | A1 * | 10/2010 | Specht | A61B 8/42 73/1.82 |
| 2014/0276069 | A1 * | 9/2014 | Amble | A61B 8/4488 600/447 |
| 2016/0136689 | A1 * | 5/2016 | Gerlach | B06B 1/0685 310/322 |
| 2016/0211924 | A1 * | 7/2016 | Deng | G08C 23/02 |
| 2017/0030798 | A1 * | 2/2017 | DeVerse | G16H 40/63 |
| 2017/0160386 | A1 * | 6/2017 | Rostocki | G01S 15/931 |
| 2017/0299751 | A1 * | 10/2017 | Chang | G01S 15/931 |
| 2018/0201011 | A1 * | 7/2018 | Efner | B41F 17/006 |
| 2019/0118224 | A1 * | 4/2019 | Kastelein | G01F 1/667 |

FOREIGN PATENT DOCUMENTS

| | | | | |
|---|---|---|---|---|
| CN | 206292395 | U | 6/2017 | |
| DE | 102006050037 | A1 * | 4/2008 | G01S 7/521 |
| DE | 102012002760 | A1 * | 8/2013 | B60R 19/48 |
| DE | 102014202144 | A1 * | 5/2015 | G01S 15/931 |
| DE | 102017115493 | A1 * | 1/2019 | |
| DE | 102018201404 | B3 * | 4/2019 | B06B 1/0651 |
| JP | 2755405 | B2 * | 5/1998 | G01S 7/529 |
| JP | 2005124652 | A | 5/2005 | |
| JP | 2006246251 | A | 9/2006 | |
| JP | 2007147319 | A | 6/2007 | |
| JP | 2012007975 | A * | 1/2012 | |
| JP | 2012198106 | A * | 10/2012 | G01S 7/521 |
| JP | 2015230201 | A | 12/2015 | |
| JP | 2019500733 | A | 1/2019 | |
| KR | 20170077374 | A * | 7/2017 | |
| WO | WO-2007069609 | A1 * | 6/2007 | G01S 15/931 |
| WO | WO-2015003836 | A1 * | 1/2015 | G10K 9/22 |
| WO | WO-2016104415 | A1 * | 6/2016 | B06B 1/06 |
| WO | WO-2016175327 | A1 * | 11/2016 | G01S 15/93 |
| WO | WO-2018071630 | A1 * | 4/2018 | A61B 5/0205 |
| WO | WO-2018139192 | A1 * | 8/2018 | G01H 13/00 |

OTHER PUBLICATIONS

WO-2016175327-A1 (attached machine translation) (Year: 2016).*
WO-2018071630-A1 (attached machine translation) (Year: 2018).*
WO-2018139192-A1 (attached machine translation) (Year: 2018).*
WO-2007069609-A1 (attached machine translation) (Year: 2007).*
JP-2755405-B2 (attached machine translation) (Year: 1998).*
JP-2012198106-A (attached machine translation) (Year: 2012).*
JP-2012007975-A (attached machine translation) (Year: 2012).*
DE-102014202144-A1 (attached machine translation) (Year: 2015).*
DE-102012002760-A1 (attached machine translation) (Year: 2013).*
DE-102006050037-A1 (attached machine translation) (Year: 2008).*
KR-20170077374-A (Machine Translation) (Year: 2017).*
DE-102018201404-B3 (Machine Translation) (Year: 2019).*
CN-103292893-A (Machine Translation) (Year: 2013).*
DE-102017115493-A1 (machine translation) (Year: 2019).*
WO-2015003836-A1 (machine translation) (Year: 2015).*

* cited by examiner

ULTRASONIC TRANSDUCER AND METHOD FOR PRODUCING AN ULTRASONIC TRANSDUCER

This patent application is a national phase filing under section 371 of PCT/EP2020/065069, filed May 29, 2020, which claims the priority of Austrian patent application 50182/2019, filed Oct. 10, 2019, which claims the priority to German patent application 102019115032.9, filed Jun. 4, 2019, each of which is incorporated herein by reference in its entirety.

TECHNICAL FIELD

The invention relates to an ultrasonic transducer and to a method for producing an ultrasonic transducer.

BACKGROUND

Ultrasonic transducers are routinely used for distance measurement in an extremely wide variety of fields. During transmitting operation, an ultrasonic signal in the form of a burst is emitted by the ultrasonic transducer for distance measurement, said ultrasonic signal, after striking an object or another obstacle, being partially reflected back again. During receiving operation, this reflected-back pulse is detected, as a result of which a propagation time can be ascertained. Since the ultrasound waves propagate in air but also in water at known speeds of sound, the distance from the reflecting object can be calculated using the propagation time.

This technology has long been known as sonar or echo sounding in shipping for example. A distance measurement in mainly the horizontal direction, that is to say from other ships for example, is referred to as sonar and a distance measurement in mainly the vertical direction, for example for measuring the depth of a body of water or the topography of the seabed, is referred to as echo sounding. Relatively modern cars use distance measurement by means of ultrasound, for example, in parking assistance systems which emit a warning signal to the driver when the car is at a short distance from a nearby object. The ultrasonic transducers are usually accommodated in the fenders which provide a relatively large amount of space for the installation of an ultrasonic transducer together with a housing and the electronics system required.

New technological developments and applications, such as drones, vacuum cleaner robots, lawnmower robots and autonomous robots for example, generally pose new challenges to an ultrasonic transducer which is suitable for distance measurement.

An ultrasonic transducer which is more compact and more robust is therefore desirable.

SUMMARY

Embodiments provide an ultrasonic transducer which is more compact and more robust.

Embodiments describe an ultrasonic transducer, which comprises a container having an opening, a base and walls. A piezoelectric disk is arranged within the container on the base, which also serves as a diaphragm. The ultrasonic transducer also comprises a cover, which closes the container. An electronics system is integrated in the cover and makes electrical contact with the piezoelectric disk and is configured to control and to read the piezoelectric disk.

The integration of the electronics system in the cover makes the ultrasonic transducer extremely compact, and therefore it can be used in applications which provide a small amount of space for the ultrasonic transducer. Robots which are becoming increasingly small, such as drones, vacuum cleaner robots, lawnmower robots or robots that are used, for example, in logistics or in industrial manufacture, provide a small amount of space for individual components, and for this reason there is a strong demand for relatively small, relatively compact sensors and in particular for ultrasonic transducers. Owing to the integration of the electronics system in the cover, it is not necessary, in contrast to conventional ultrasonic transducers, to build the ultrasonic transducer into an external housing in which the electronics system is installed. Since the function of a sound-emitting container is combined with the function of a sensor housing, the ultrasonic transducer, in contrast to conventional ultrasonic transducers in which the sound-emitting container is incorporated into the sensor housing, can be designed to be very much more compact. Furthermore, costs of production can be saved since additional electrical and mechanical interfaces are not required and the assembly of the ultrasonic transducer and the housing can be dispensed with.

During transmitting operation, the piezoelectric disk can be excited, via an AC voltage applied by the electronics system, into pulse-like oscillation with a frequency of approximately 50 kHz to 100 kHz and a predetermined number of periods. The number of periods may be, for example, 8 periods. Since the piezoelectric disk can be fixed to the base, the base can oscillate with it as a diaphragm and can emit an ultrasound cone. If the ultrasound cone strikes an object or another obstacle, it can be partially reflected back again. The reflected sound pulse can in turn strike the base or diaphragm and can induce a mechanical deflection with the same frequency as the emitted sound pulse both in the base and in the piezoelectric disk. The mechanical deflection of the piezoelectric disk can cause a change in voltage at the applied electrodes and this can in turn be read by the electronics system. The distance from the reflecting object can be calculated from the ascertained propagation time of the ultrasonic pulse and the known speed of sound.

A damping element can be arranged between the base, on which the piezoelectric disk is arranged, and the cover, which damping element fills the entire container. The damping element can primarily serve to damp the ultrasonic oscillations from the piezoelectric disk in the direction of the cover, but can also further additionally stabilize the container. The most important material property for the damping element is the damping constant which should be as large as possible given typical ultrasound frequencies of between 50 kHz and 100 kHz. Suitable materials are rubbers or foams. In particular, foams composed of plastics, such as silicone for example, which comprise gas pockets are suitable for the damping element. These can be passed, for example in liquid form, into the container, where the silicone cures and positively fills the container.

Here, the arrangement of an elastic ring, which can likewise be composed of silicone, between the damping element and the cover can help to prevent possible transmission of vibrations from the container to the cover. Moreover, the elastic ring can serve to provide sealing between the cover and the container, so that no moisture or dust can enter the container.

The cover can be fixed in the container by way of a re-closeable fastening mechanism. Therefore, it is possible to access the bottom side of the cover at any time, for example in order to test or to repair electrical components or contact-connections. If the cover is configured to be just short of the cross section of the container, it may be advantageous to position an elastic ring beneath the cover in order to obtain a slight clearance when the cover is opened. The fastening mechanism may expressly be a snap-in mechanism which can releasably fix the cover in at least one position.

The container comprises an opening which faces away from the base. The cover can be arranged in this opening in such a way that the cover does not terminate flush with an edge of the opening. The cover can be arranged in a step in the wall of the container and the step can be dimensioned such that the cover resting on it does not terminate flush with the edge of the opening. Accordingly, the cover can be at a distance from the opening. The cover can be set back from the opening by a spacer. The spacer can be, for example, a silicone ring. Therefore, the electronics system, which is integrated in the cover, is protected against shocks and other mechanical loads. The space between the cover and the edge of the opening can be sealed using a potting compound, such as a lacquer for example. If the container is further composed of a conductive material, or comprises a conductive material, the container acts in the manner of a Faraday cage, as a result of which the electronics system in the cover is also protected against electromagnetic radiation which could disadvantageously influence the electronics system and could therefore lead to incorrect measurement results.

The cover can further comprise at least two recesses. These can be arranged, for example, on opposite sides of the cover. The container can be filled with a liquid filler material through a recess in the closed state too, i.e. when the container is closed by the cover. Therefore, a positive connection can be formed between the filler material and the cover and air pockets between them can be avoided since the liquid filler material completely fills the container. A second recess facilitates continuous pressure equalization in the container during the filling process. Therefore, bubbles, which can otherwise readily occur on account of air pockets during the filling process, are avoided and a homogeneous positive filler is formed in the container.

A passage for a wire can be formed at least in one of the recesses, wherein the piezoelectric disk can be electrically connected to the electronics system by the wire. Owing to the passage, the wire can be mechanically stabilized and a robust electrical connection can be established. The container can additionally be filled with filler material such that it covers the passage and the contact-connection between the wire and the electronics system and protects the electrical connection itself against external influences after curing.

Furthermore, the container can comprise a step along the opening in one wall. This step serves as a bearing area for the cover, so that the cover can be easily arranged in the container, without the risk of the cover slipping into the container. In order to connect the cover to the container in a fixed and damped manner, it may be advantageous to arrange a silicone or foam layer between the cover and the container.

The electronics system can comprise a digital I/O interface on an outer side of the cover. In a preferred exemplary embodiment, the digital I/O interface can likewise implement the electrical power supply to the ultrasonic transducer. Since the connection is arranged directly on the cover, the ultrasonic transducer can be kept compact. The ultrasonic transducer can also be quickly contacted in this way and does not need any further electrical connections. The digital I/O interface is particularly suitable for communication, for example in order to pass measurement signals or warning signals to the outside, since it has a higher resistance to interference than analog interfaces and therefore also functions without faults in an environment affected by interference signals.

The electronics system can comprise pins on the outer side of the cover. Said pins can be, for example, three straight electrical conductors which project, starting from the cover, oppositely to the direction to the base from the container. In particular, the pins can be configured to simultaneously serve as an electronic connection and to mechanically fasten the ultrasonic transducer. Accordingly, installation of the ultrasonic transducer can be simplified since the ultrasonic transducer can be locked by way of a plug-in system at its site of use by the pins, without that a further tool or further fastening mechanisms being required. The pins can further also be used only to support other types of fastening.

The base can further be thinner than 1 mm. The base, which likewise serves as a diaphragm, firstly has to be elastic enough to follow the deflection movements of the piezoelectric disk and secondly should be stable enough to withstand external influences, such as jets of water for cleaning purposes for example. A thickness of the base of less than 1 mm and more than 0.2 mm have proven to be advantageous. The thickness of the base, together with the diameter, can also substantially determine the resonant frequency at which the component can advantageously be operated for outputting and receiving ultrasound.

The thickness of the walls can be more than 1.5 times the thickness of the base and is preferably more than 3 times the thickness of the base. It has been found that such wall thicknesses are suitable for suppressing the transmission of vibrations of the base or the diaphragm to an area which runs parallel to the base, such as the cover or an excess length of the container for example, which can be used to support the ultrasonic transducer. Vibrations which are transmitted via the holder to an adjacent fastening, which belongs to the application, could then be reflected and therefore incorrectly detected as a measurement signal in the ultrasonic transducer in the form of a phantom signal. If the wall thickness is selected such that it is at least 1.5 times the thickness of the diaphragm, transmission of vibrations from the base to other parts of the container can be suppressed. The base has certain natural modes which oscillate in a natural frequency and are determined, amongst other things, by the thickness of the base. Since the wall can have a thickness of at least 1.5 times the thickness of the base, transmission of the modes of oscillation to other regions of the container can be suppressed. However, the wall thickness should not be more than 20 times, preferably not more than 10 times, the thickness of the base since the component may otherwise become too heavy and a small design of the component is more difficult to implement.

Furthermore, the container can be designed to give preference to one plane of the sound propagation direction. Since the propagating sound cone is restricted, the accuracy of the distance measurement can be increased since the propagation of the sound wave in one direction in space can be precluded. In the simplest case, the container is designed to be oval for this purpose. Other shapes for the container can likewise be configured to give preference to propagation of the sound in one plane.

The container can consist of an electrically conductive material. A container composed of an electrically conductive material, which is connected to the electrical ground of the sensor, increases the electromagnetic compatibility, as a result of which other electrical devices in the surrounding area cannot undesirably interfere with the ultrasonic transducer. In an advantageous exemplary embodiment, the container can be grounded via the optional digital I/O connection. For example, a large number of electric motors, which can emit electromagnetic interference signals, can be installed, in particular, in relatively small mobile applications, such as drones or autonomous robots for example. If the container is manufactured from an electrically conductive material, the piezoelectric disk and an electronics system arranged in the interior of the container can be shielded from external interference signals.

Suitable materials may be metals, such as Al, Cu, Sn, Fe and steel, but also alloys. Since the base of the container also acts as a diaphragm, it is advantageous to use a material which has a relatively high degree of flexibility. Therefore, metals with a low modulus of elasticity, such as Al or Sn, are particularly preferred.

Furthermore, the inner surface of the container can be partially roughened and/or smoothed. Roughening the surface in the interior of the container results in materials adhering to this surface better, but in return the ultrasound is also scattered to a greater extent over this surface. Smoothing the surface reduces adhesion to the surface, but does not scatter the ultrasound. For this reason, it may be advantageous, for example, to roughen the surface of the base adjacent to the piezoelectric disk so that it adheres better there. The rest of the area of the base in the interior of the container can be smoothed for example in order to reduce the adhesion of a damping element at this point and therefore to impede deflection of the piezoelectric disk to a lesser extent. In addition, the inner surface of the container can also be roughened, as a result of which the sound is scattered to a greater extent over this surface. For example, a sandblasting or etching process can be used for roughening purposes and a grinding or coating process can be used for smoothing purposes.

The container can be anodized, in particular by an electrolytic oxidation of aluminum ('eloxal'-anodization). Anodization protects the container against corrosion and makes it more resistant to environmental influences. An inner surface of the container can be anodized and an outer surface can be untreated, or an inner surface of the container and an outer surface of the container can be anodized. It is also possible to anodize an outer surface of the container and to leave an inner surface untreated. An inner surface of the container can primarily be anodized in order to protect the container against damage by a filler material, solvents used or due to chemical reactions. Anodization is particularly advantageous on an outer surface of the container since the outer surface is exposed to the environment and anodization protects the container against corrosion. In order to protect the container as well as possible, anodization both on the inner surface and on the outer surface of the container is advisable.

An inner surface of the container can comprise an anodization layer, wherein the anodization layer can comprise an aperture. For example, for this purpose, an anodized inner surface of the container can be deliberately breached at one point in order to allow electrical contact to be made with the container through the electrically non-conductive anodization layer.

An electrical connection from the piezoelectric disk and in addition or as an alternative the electronics system to a reference potential can further be formed via the aperture. This can be implemented, for example, by means of soldering at the aperture.

An inner surface of the container can additionally comprise a conductive layer. If the container consists of a material which is not conductive, a Faraday cage is formed by the conductive layer, said Faraday cage protecting the electronic components arranged in the interior of the container against external influences and therefore contributing to the measurement stability and the measurement accuracy. If an inner surface of the container is further anodized or provided with another protective layer, a conductive layer on the inner surface creates the possibility of implementing grounding for installed electronic components via the conductive layer.

A portion of the base can have a greater thickness than the base area adjacent to the piezoelectric disk and used as a diaphragm. The reinforced areas stabilize the container and are suitable for use as bearing areas on a fastening, a frame or a carrying structure in an application.

In an advantageous embodiment, an area of the container that runs parallel to the base and does not overlap with the base can have a greater wall thickness than the base area adjacent to the piezoelectric disk. The reinforced areas serve to stabilize the container and to function as bearing areas in this embodiment as well. Owing to an arrangement of the reinforced areas to the side of the base, the container can be arranged in a hole such that the base of the container is arranged in the hole together with the piezoelectric disk and the reinforced areas rest above the edge of the hole. Therefore, an ultrasonic transducer arranged in a hole in this way can carry out distance measurements through the hole.

The reinforced areas can comprise an adhesive material on an outer surface. Therefore, unproblematic incorporation of the ultrasonic transducer into an application is ensured. For this purpose, the ultrasonic transducer merely has to be positioned at the intended point, so that the adhesive material adheres to the fastening. It is desirable for the adhesive material to consist of a foam-like soft material with gas pockets which damps vibrations from the ultrasonic transducer to the fastening.

Sound-damping components can be arranged on an outer surface of the container. The sound-damping components damp the ultrasound and vibrations with respect to an undesired propagation direction. The sound-damping components are preferably composed of a foam-like material. Design as an electrically conductive material is desirable in order to not reduce the electromagnetic compatibility of the ultrasonic transducer but rather, on the contrary, to further increase it.

In one embodiment, the cover is a printed circuit board. In this way, the electronics system can be easily integrated into the cover and electrical contact can readily be made with all of the electrical components required. In addition, since the conductor tracks can be modulated, the arrangement of electrical components on the conductor track can be changed, so that the electrical components can be arranged in a space-saving or geometrically advantageous manner.

If a printed circuit board is used as the cover, it can be flexible. Therefore, ultrasound, which propagates from the piezoelectric disk to the cover, can be damped and both phantom signals and the transmission of vibrations can be suppressed. The installation of a flexible printed circuit board as a cover can also be executable more easily than a rigid printed circuit board.

The printed circuit board can comprise electrical ground areas, which are grounded, on the outer side. Therefore, the electromagnetic compatibility of the ultrasonic transducer can be increased. At the same time, the electrical components arranged on the printed circuit board and the printed circuit board itself can be protected against dangerous voltage peaks.

Furthermore, the printed circuit board, which is used as a cover, can be potted in a plastic compound. The plastic compound is preferably also flexible after curing in order to damp vibrations. The plastic compound fills existing cracks or holes in the printed circuit board and gaps between the printed circuit board and the container. Accordingly, the container is sealed in an airtight manner and the propagation of the ultrasound waves in this direction can be suppressed. Furthermore, a tight closure can be implemented by a cover in this way, said closure not having a contact point with the walls of the container. Therefore, transmission of vibrations between the cover and walls is suppressed. The plastic compound used may be, for example, a silicone or a soft resin.

The printed circuit board can comprise electrical components which are arranged on an area of the printed circuit board that faces the piezoelectric disk. Therefore, the electrical components are protected both against possible damage on account of mechanical or chemical environmental influences and against external electromagnetic interference signals. In addition, the ultrasound can be scattered on an uneven surface of the cover caused by the electrical components and undesired propagation of the ultrasound can be avoided.

The printed circuit board can comprise an integrated circuit with a charge pump. For operation, the piezoelectric disk usually requires a higher voltage than the frequently prescribed supply voltage of 5 to 12 V. In this case, it is necessary to generate a higher-value operating voltage for the piezoelectric disk from the low supply voltage. Since transformers have a large physical size, it is advantageous to generate the higher operating voltage for the piezoelectric disk from a low supply voltage using a charge pump which is contained in an integrated circuit.

The printed circuit board can further comprise an analog ground line and a digital ground line, wherein the analog ground line and the digital ground line can be configured such that electromagnetic interaction between the digital ground line and the analog ground line can be suppressed. In this way, it is possible to prevent rapid oscillations, which can form, for example, on the digital ground line on account of the rapid switching times of the integrated circuit, from parasitically propagating onto the analog ground line and causing interference in the distance measurement. In particular, charge pumps tend to generate a low offset voltage on the ground line. Interference in the distance measurement is suppressed owing to a configuration of the digital and the analog ground line so that they do not influence each other.

The analog ground line and the digital ground line can be arranged on opposite sides of the integrated circuit. Therefore, a physical distance between the digital and the analog ground line is already prescribed, and therefore electromagnetic interaction between the ground lines is avoided and no undesired interference occurs.

The ultrasonic transducer can further comprise a temperature sensor. The speed of sound in media is always temperature-dependent, as a result of which the distance measurement by the ultrasonic transducer is also dependent on the ambient temperature. The linear correction formula for the speed of sound in air can read $c_{air}=(331.3+0.606*v)$ m/s, where v is the air temperature in ° C. By measuring the air temperature, this correction term can be applied to the measured distance in order to render possible a correct distance measurement. Here, the integration of a temperature sensor into the ultrasonic transducer can help to implement correct distance measurement within a wide temperature range.

The temperature sensor can comprise, for example, an NTC sensor or a PTC sensor. These have a high degree of measurement accuracy and robustness together with a low level of energy consumption. Furthermore, NTC and PTC sensors can be readily incorporated into electrical circuits, as a result of which they are extremely suitable for use in the ultrasonic sensor.

It may be advantageous to arrange the temperature sensor in the interior of the container. In the interior of the container, the temperature sensor is protected against external hazards. Direct arrangement on an inner surface of the container leads to the temperature sensor being in good thermal contact with the surrounding area since the wall thickness of the container is low and, if it consists of metal, the container also exhibits excellent thermal conductivity. In a particularly preferred arrangement, the temperature sensor can rest on the base of the container. At this point, the wall thickness is particularly low and therefore particularly good thermal contact from the temperature sensor to the surrounding area is provided. In addition, heat is inevitably produced by the electronics system integrated in the cover, and this may corrupt a temperature measurement. Therefore, integration of the sensor chip in the cover may be disadvantageous since the temperature measurement may be corrupted. Since the temperature sensor is at the greatest possible distance from the cover since it is arranged on the base, a more accurate temperature measurement is rendered possible.

In one embodiment, the piezoelectric disk can be used as a temperature sensor. The piezoelectric disk consists of a piezoelectric material which is arranged between two electrodes and therefore forms a capacitance. The piezoelectric material expands or contracts depending on the ambient temperature, as a result of which the distance between the electrodes and therefore the capacitance of the piezoelectric disk are also changed. Since the capacitance of the piezoelectric disk is measured using the electronics system integrated in the cover, conclusions can be drawn about the temperature from the capacitance and the distance measurement by the ultrasonic transducer can be corrected on the basis of the ambient temperature.

The ultrasonic transducer can be configured to compensate for a temperature dependence of measured distances on account of the temperature dependence of the speed of sound on the basis of measurement values from the temperature sensor. By way of correcting the measured distances using a term which depends on the ambient temperature, the ultrasonic transducer can provide precise measurement results in a wide temperature range, which can extend from −40 to 85° C. for example.

The ultrasonic transducer can be integrated in an arrangement which has a fastening for an associated application, wherein the ultrasonic sensor can be arranged directly on the fastening without a further housing. Such an arrangement does not require a further housing for the ultrasonic transducer, and therefore space is saved and the ultrasonic transducer can also be used in a crowded environment. This allows use of the ultrasonic transducer in applications which remain unfeasible for customary ultrasonic transducers, such as small drones or autonomous robots for example.

A device can comprise an ultrasonic transducer according to the present invention, wherein the device can be configured to measure a distance of the device from an object on the basis of a signal ascertained by the ultrasonic transducer.

The device may include, for example, autonomous robots, such as self-driving robots in warehouse logistics or in industrial manufacture, vacuum cleaner robots, lawnmower robots or autonomous flying objects, such as drones. However, the ultrasonic transducer can also be used in devices such as cars, charging stations in electromobility or laptops as well as control devices with a monitor as an interface for the operator.

A further aspect relates to a method for producing an ultrasonic transducer. Said ultrasonic transducer may be, for example, the ultrasonic transducer described above.

The method for producing an ultrasonic transducer comprises the following steps:

producing a container having an opening, a base and a wall using an impact extrusion process;

fastening a piezoelectric disk on the base of the container;

closing the container by way of a cover which comprises an integrated electronics system, wherein the electronics system makes electrical contact with the piezoelectric disk and is configured to control and to read the piezoelectric disk.

The cover can be, in particular, a printed circuit.

Before the container is closed, a first silicone ring can be arranged on a bearing area of the container facing away from the base and can be cured, wherein, in the step of closing the container, the cover is arranged on the first silicone ring. A foam layer can be used as an alternative to the first silicone ring.

A second silicone ring can be arranged on the side of the cover that faces away from the base, wherein the cover is fixed between the first and the second silicone ring.

The electronics system can make electrical contact with the piezoelectric disk via a wire which is soldered to the electronics system. The electronics system can preferably make contact with the piezoelectric disk via two wires, wherein each of the two wires is soldered to the electronics system.

The cover can comprise at least one recess in which the wire is arranged, wherein, in the step of closing the container, the cover is pushed onto the container with a translational movement and the wire is subsequently soldered to the electronics system. The cover can have a recess for each wire.

A cavity between the cover and the base can be filled with a liquid filler material, wherein the liquid filler material is cured to form a damping element. The cover can have a further recess through which the liquid filler material is filled. In this case, so much liquid filler material can be introduced that it emerges from the recesses in which the wires are arranged. The emerging filler material coats and, after it cures, protects the contact point of the respective wire with the cover.

In order to adjust the color or properties of the ultrasonic transducer to customer requirements, the container can be suitably treated, for example coated, anodized or lacquered, in particular on the outer surface of the base that faces away from the cover. The cover can additionally be coated with a protective layer or encapsulated with a film or foil or a further cover.

BRIEF DESCRIPTION OF THE DRAWINGS

The invention will be described in more detail below with reference to schematic illustrations.

DETAILED DESCRIPTION OF ILLUSTRATIVE EMBODIMENTS

Figure 1:
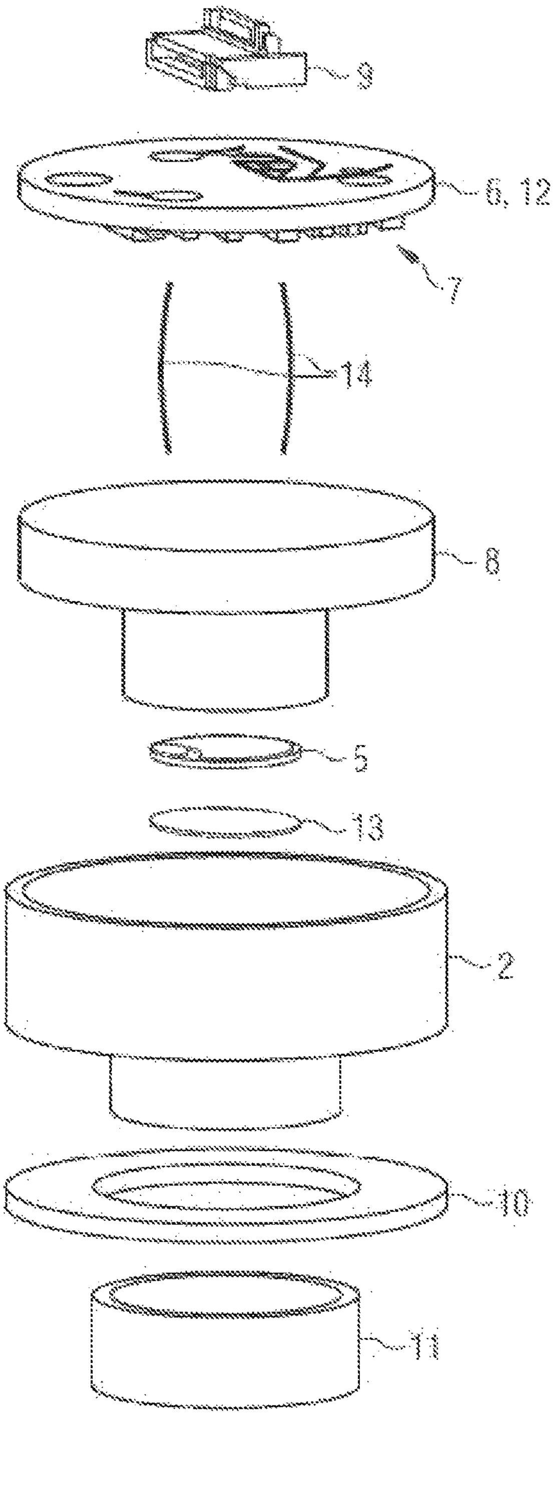
FIG. 1 shows an exploded view of an ultrasonic transducer.

FIG. 1 shows an exploded view of an ultrasonic transducer 1. A container 2, which comprises an opening, a base 3 and a circular wall, is constructed from two cylindrical parts, a lower part and an upper part. The lower part has a smaller radius than the upper part and is closed at a lower round base area by way of the base 3, which also serves as a diaphragm. The lower part is open at the top. The entire container 2 is formed from one piece and the upper part is therefore connected to the lower part via a connecting area which runs parallel to the base 3. The upper part is likewise open at the top.

In the interior of the container 2, a piezoelectric disk 5 is fixed to the base 3 by way of an adhesive layer 13 or an adhesive disk. A damping element 8 is arranged above said piezoelectric disk and is matched to the shape of the container 2 and completely fills it. The piezoelectric disk 5 is connected to an electronics system 7 via wires 14. Said electronics system is arranged on a side of a cover 6 that faces inward. The cover 6 itself is a printed circuit board 12 and comprises a digital I/O interface 9 on a side that faces outward.

The digital I/O interface 9 not only implements communication to the outside but also supplies electricity to the electronics system 7 and the piezoelectric disk 5. The arrangement of the digital I/O interface 9 on the cover 6 renders possible a compact design of the ultrasonic transducer 1 and a simple contact-connection since no further connections have to be considered. In contrast to analog interfaces, a digital I/O interface 9 has a high tolerance to interference signals which can originate, for example, from nearby electric motors. For example, the interface can also be implemented byway of an FFC connector. This provides, via its eight contacts, a debug interface which provides a large number of reading options which may be advantageous, in particular, for developers and in relatively complex applications. As a particularly simple alternative, a 2- or 3-wire interface can be used as the interface. These are the most cost-effective interfaces from amongst the alternatives mentioned above. In addition, simple pin headers, which are provided with two to eight pins, are possible as the interface for the ultrasonic transducer 1.

The cover 6 is a printed circuit board 12 which comprises, on an outer side, ground areas and, on an inner side, the electronics system 7 in the form of electrical components. The cover 6 is preferably shaped such that it does not touch the walls of the container 2. The conductor tracks on the printed circuit board 12 can be adjusted in order to arrange the electrical components, for example, in a space-saving or geometrically advantageous manner with respect to the shape of the container 2.

Owing to the arrangement of the electronics system 7 on the inner side of the cover 6, the electrical components, if the container 2 consists of an electrically conductive material, are protected against external electromagnetic interference signals.

Furthermore, the uneven surface, which is caused by the electrical components, facilitates scattering of ultrasound which propagates from the piezoelectric disk 5 to the cover 6, and therefore the wrong way around. A further advantage of the arrangement of the electronics system 7 on the inner side of the cover 6 is that the electronics system 7 is protected against mechanical or chemical damage which can result from environmental influences.

Since the printed circuit board 12 is flexible and/or is potted in a plastic compound, ultrasound which propagates from the piezoelectric disk 5 to the cover 6 can be damped and therefore further propagation of vibrations and associated phantom signals can be suppressed. Installation of a flexible printed circuit board 12 as the cover 6 may be easier to carry out than for rigid covers 6. The plastic compound is used for filling possible cracks and holes in the printed circuit board 12 and a possible gap between the cover 6 and the container 2. Therefore, the container 2 can be sealed and the propagation of the ultrasound waves can be suppressed even better. If a cover 6 which is smaller than the container 2 is used, a tight closure, which even reduces transmission of vibrations between the cover 6 and the wall 4, can nevertheless be implemented by way of the plastic compound. The plastic compound used may be, for example, a silicone or a soft resin.

The cover 6 can be fixed in the container 2 by way of a re-closeable fastening mechanism. The fastening mechanism may be, for example, a snap-in mechanism which releasably fixes the cover 6 in one position. As a result, the cover 6 can be opened and the electrical components or contact-connections of the electronics system 7 on the inner side of the cover 6 can be inspected. If the cross section of the cover 6 corresponds to the inside cross section of the container 2, it is advantageous to position an elastic ring 22, which may be composed of silicone for example, beneath the cover 6. In this way, a slight clearance can be permitted when the cover 6 is opened, said clearance making the opening process easier.

Figure 2:
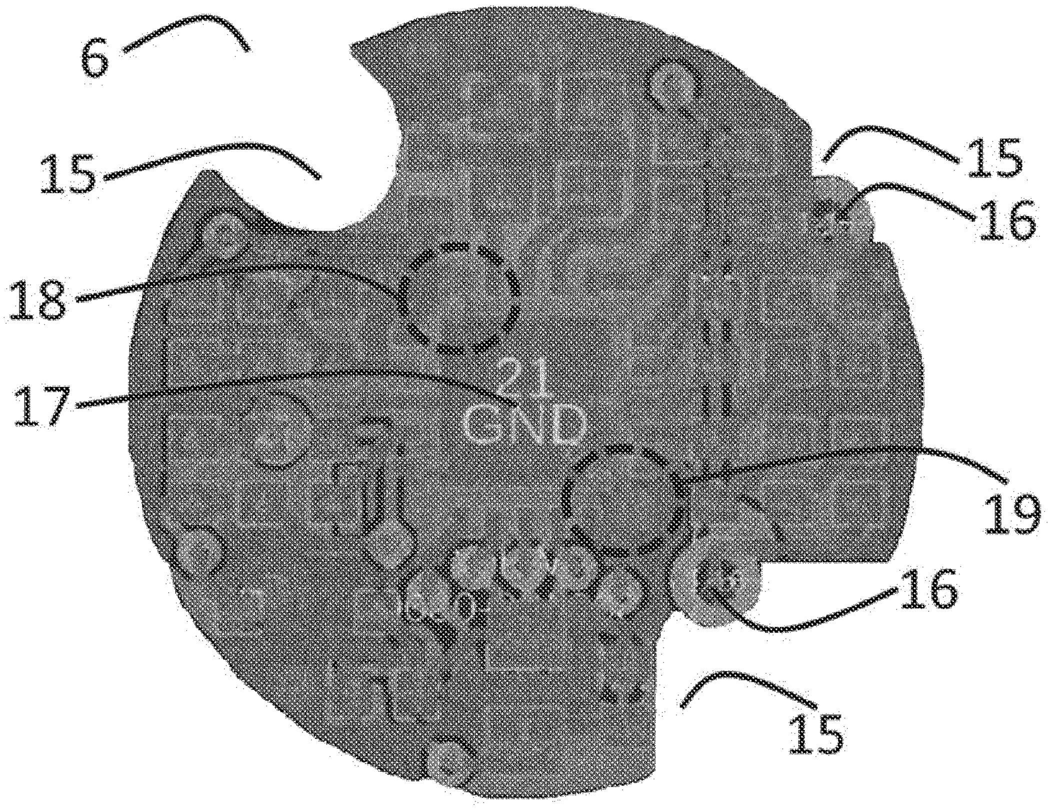
FIG. 2 shows a plan view of a bottom side of a cover.

FIG. 2 shows an exemplary embodiment for an outline shape and for a layout of the conductor tracks of a cover 6. The cover 6, together with the electronics system 7, can be covered by a protective layer on the outer and the inner side of the cover 6 in order to protect the lines, the electronics system 7 and the contact-connections against moisture, corrosion and possible short circuits. The protective layer may be, for example, a lacquer or a potting compound.

The cover 6 has three recesses 15 at the edge, wherein two of the three recesses 15 are situated on opposite sides of the cover 6. The opposite recesses 15 allow the cover 6 to be able to be handled more easily when it is inserted into the container 2. For example, the recesses 15 in the cover 6, which recesses can likewise comprise an electrical connection between the outer and the inner side, allow simpler contact-connection between the wires 14 and the electronics system 7. For example, owing to the recesses 15, it may be possible to push the cover 6 against the wires 14 with a translational movement. The cover 6 can be further moved to a certain extent via the recesses 15 for simple contact-connection, which is implemented by way of a soldering process for example, in order to in this way create a certain amount of flexibility for making contact with the cover 6 by means of the wires 14. As an alternative, the wires 14 would have to be threaded through small holes in the cover, as a result of which assembly of the ultrasonic transducer would be made more difficult.

Advantageous mounting of the cover 6 is performed as follows. Firstly, on the container 2, a bearing area and adjacent side faces of the cover are covered with a damping material, for example silicone, and this is cured if necessary. The cover 6 is then arranged in the container 2 and an electrical contact-connection is established between the piezoelectric disk 5 and the electronics system 7 via the wire 14. Once electrical contact is made with the cover 6, it is pushed to its final position. A further layer of damping material, such as silicone for example, is then adhesively applied along the outer circumference of the cover 6, this fastening the cover 6 in its position. Subsequently, the container can be filled with a liquid damping material.

Furthermore, the container 2 can also be filled with a liquid filler material through a recess 15 in the closed state. This ensures that a positive connection can be formed between the damping element 8 and the cover 6 as well as the electronics system 7 since air pockets between the cover 6 and the damping element 8 are avoided since the liquid filler material completely fills the container 2. This ensures that the electronics system 7 on the cover 6 is even better protected by the positive damping element 8 and the cover 6 is damped with respect to vibrations. In particular, transmission of vibrations from the container 2 to the cover 6 can be suppressed owing to the damping of the cover 6 by the damping element 8, and therefore no acoustic side lobes, which may corrupt the distance measurement, can form. Since more than one recess 15 is made in the cover 6, continuous and uniform pressure equalization can take place during the filling process. This prevents bubbles and air pockets which may otherwise readily occur during the filling process. Instead, a homogeneous positive damping element 8, without macroscopic air bubbles, is formed in the container 2.

A passage 16 for a wire 14 has been formed in two of the three recesses 15. The piezoelectric disk 5 can be electrically connected to the electronics system 7 in the cover 6 owing to said passages. The electrical connection between the wire 14 and the electronics system 7 is stabilized owing to the passage 16. In one embodiment, the container 2 can be filled with a liquid filler material such that the liquid filler material covers the recesses 15 and therefore also the passage 16 and the contact-connection between the wire 14 and the electronics system 7. Owing to the coating composed of liquid filler material, which subsequently dries, the contact-connection between the wire 14 and the electronics system 7 is protected against external influences. Furthermore, the cover 6, after mounting, can be coated on the outer side with a protective layer and sealed by way of a film or foil or a closure in order to protect the ultrasonic transducer 1 and the electronics system 7 from the surrounding area.

In the layout of the conductor tracks that is shown in FIG. 2, an integrated circuit 17 is arranged in the center. The integrated circuit 17 has a charge pump with which the operating voltage required by the piezoelectric disk 5, which operating voltage is higher than a supply voltage of the circuit of between 5 and 12 V, can be generated. As an alternative, transformers could be used for generating higher voltages, but these have a large physical size. Charge pumps tend to generate a low offset voltage on the ground line. Rapid oscillations on the ground lines, which rapid oscillations can form, for example, on a digital ground line 19 on account of the rapid switching times of the integrated circuit 17, can parasitically propagate onto an analog ground line 18 and therefore cause interference in the signal processing and the distance measurement. Since the digital and the analog ground line 18, 19 are configured such that they do not influence each other, interference in the distance measurement is suppressed. This has been achieved with the layout that is shown in FIG. 2.

Firstly, an electromagnetic decoupling of the digital ground line 19 is achieved by way of the analog ground line 18 and the digital ground line 19 being arranged on opposite sides of the integrated circuit 17. In the layout from FIG. 2, the digital ground line 19 is arranged at the bottom right corner of the integrated circuit 17 and forms a ground area there, whereas the analog ground line 18 is formed merely by a short conductor track at the top left corner of the integrated circuit 17. Therefore, a physical distance between the digital and the analog ground line 18, 19 is prescribed, and therefore electromagnetic interaction between the ground lines is avoided and no undesired interference occurs.

The damping element 8, which is arranged between the cover 6 and the base 3 and fills the entire container 2, primarily serves to damp the ultrasound and the vibrations that originate from the piezoelectric disk 5. Therefore, the most important property for the damping element 8 is the damping constant, in particular for typical ultrasound frequencies of between 50 kHz and 100 kHz, where the damping constant should be as large as possible. Rubbers or foams have suitable damping properties. Foams composed of plastics, such as silicone for example, which comprise gas pockets are expressly suitable as materials for the damping element 8. These can be positioned into the container 2 as solids or poured into the container 2 as liquids, where the liquid compound, such as two-component silicone for example, cures and positively fills the container 2. In addition to damping the ultrasound waves, the damping element 8 also further mechanically stabilizes the container 2, so that the container 2 withstands a greater external pressure.

An adhesive material 10 is arranged on an outer surface of the connecting area between the upper and the lower part of the container 2. The adhesive material 10 is preferably composed of a foam-like, soft material that damps vibrations. Owing to the use of the adhesive material 10, installation of the ultrasonic transducer 1 is simplified since the ultrasonic transducer 1 merely has to be placed in a target position, so that the adhesive material 10 adheres to a fastening. A foam-like material reduces transmission of vibrations from the ultrasonic transducer 1 to the fastening. Said fastening may be, for example, a double-sided adhesive tape which has a foam-like core. This adhesive tape can already be applied to the intended area by way of one side of the adhesive tape, wherein a second adhesive side of the adhesive tape can remain covered by a protective film or foil until the ultrasonic transducer 1 is finally mounted into an application.

A vibration-damping component 11 is arranged along an outer surface of the wall 4 of the lower part of the container 2. The vibration-damping component 11 damps the ultrasound and vibrations with respect to an undesired propagation direction perpendicular to the base 3. The vibration-damping component 11 is preferably composed of a foam-like material which is preferably also electrically conductive in order to increase the electromagnetic compatibility of the ultrasonic transducer 1. However, it is also possible to use a non-conductive material, such as silicone for example.

Figure 3:
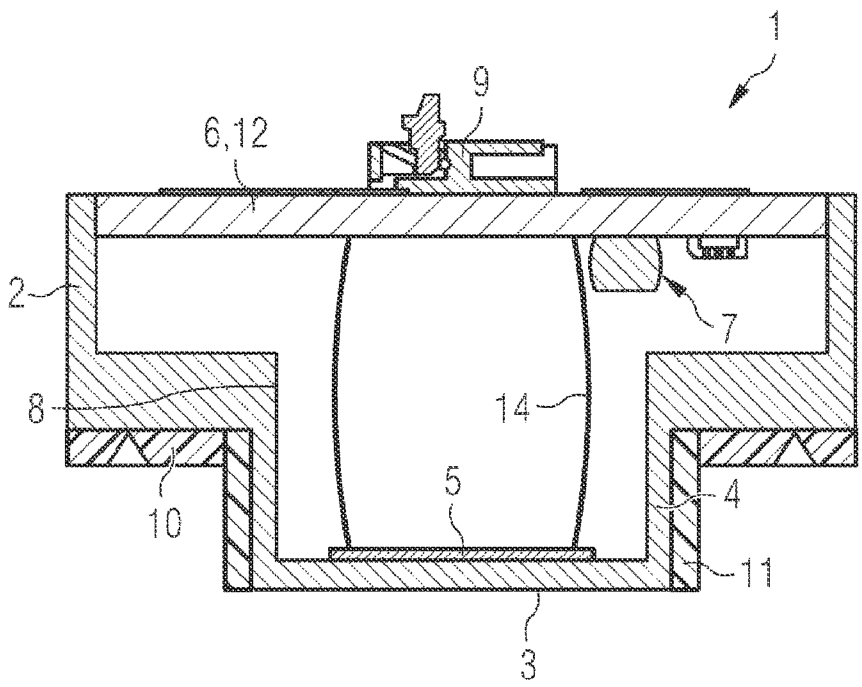
FIG. 3 shows a cross section through an assembled ultrasonic transducer.

FIG. 3 shows the cross section through an assembled ultrasonic transducer 1. The wall 4 of the lower part of the container 2 is clad with a vibration-damping component 11 from the outside and the connecting area between the lower and the upper part of the container 2 is provided with adhesive material 10 from the outside. A piezoelectric disk 5 is arranged on the base 3 in the interior of the container 2 and is electrically contact-connected to the electronics system 7 via wires 14 through the damping element 8, which fills the entire container 2.

The connecting area between the upper and the lower part of the container 2 is thicker than the rest of the container 2. These reinforced connecting areas are designed to be used as bearing areas on a fastening, a frame or a carrying structure in an application. The base 3, which is also used as a diaphragm, is thinner than 1 mm. On the one hand, the base 3 has to be elastic enough to not severely impede the deflection movements of the piezoelectric disk 5. On the other hand, the base 3 has to have a certain degree of stability, so that it is not damaged in the event of an external action of force, such as when sprayed with water for cleaning purposes for example. An advantageous compromise has been found with a thickness of the base 3 of less than 1 mm and more than 0.2 mm. The walls are at least 1.5 times as thick as the base 3, but if possible should be more than 3 times the thickness of the base 3. Such a large wall thickness is suitable for reducing the transmission of vibrations from the base 3 or the diaphragm to the connecting area between the upper and the lower part of the container 2. Since the connecting area may be a bearing area for the ultrasonic transducer 1 to form a fastening, vibrations and deflections should be avoided precisely at these connecting areas. Otherwise, vibrations may be transmitted to an adjacent fastening which belongs to the application. The transmitted vibrations may in turn be reflected and therefore incorrectly detected as a measurement signal in the ultrasonic transducer 1 in the form of a phantom signal. A wall thickness of at least 1.5 times the thickness of the diaphragm reduces the transmission of vibrations from the base 3 to other parts of the container 2 and in this way prevents the problem.

Figure 4:
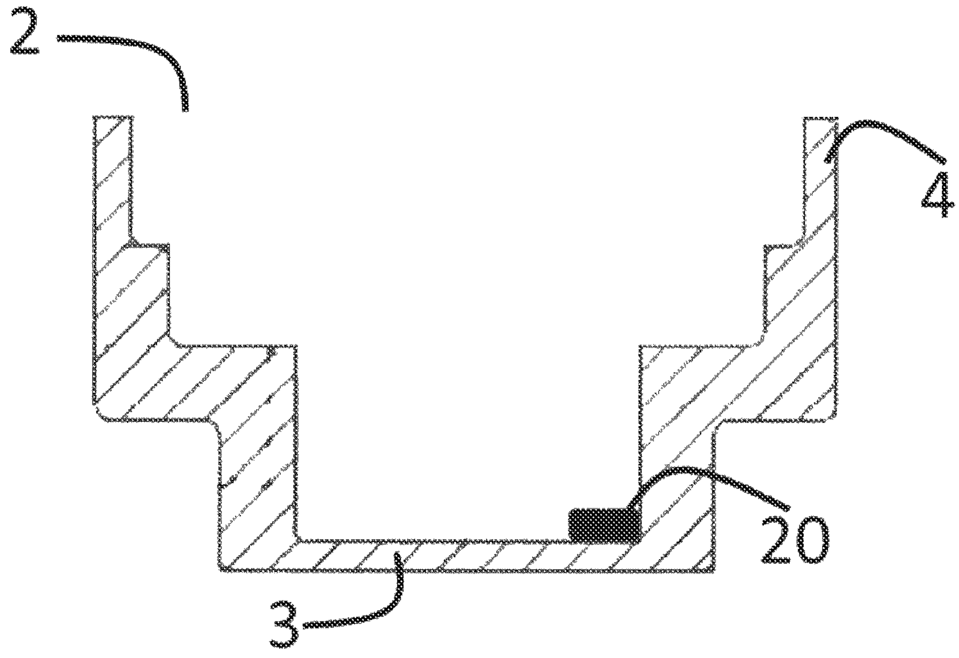
FIG. 4 shows an alternative embodiment of a container in which a temperature sensor is arranged.

In a further embodiment of the container 2 that is shown in FIG. 4, the container 2 has a step along the opening in the wall 4. This step is used as a bearing area for the cover 6, so that the cover 6 can be easily arranged in the container 2. The cover 6 can be connected to the container 2 in a fixed and vibration-damped manner by way of a silicone or foam layer being used between the cover 6 and the container 2 as a composite material. A further layer of silicone or foam can be placed on or in the edge between the embedded cover 6 and the container 2 in order to render the ultrasonic transducer 1 even more water resistant.

All the corners of the container 2 are rounded with a small radius. This is due to the production method for the container 2 which can be produced using an impact extrusion process. Here, an aluminum slug is pressed between an inner punch and an outer die to form the container 2. In order to easily release the container 2 from the stamping tool, it is advantageous to avoid sharp edges and corners and instead to establish rounded portions at corners.

FIG. 4 furthermore shows a temperature sensor 20 which is arranged on an inner surface of the container 2, on the base 3. Since the speed of sound in a medium is temperature-dependent, a distance measurement by the ultrasonic transducer 1, which distance measurement is based on the propagation time of a sound pulse, will also depend on the ambient temperature. The linear correction formula for the speed of sound in air can read $c_{air}$=(331.3+0.606*v) m/s, where v is the air temperature in ° C. In order to render possible a correct distance measurement by the ultrasonic transducer 1, this correction term is taken into account in the distance measurement. Therefore, a correct distance measurement can be implemented in the range of from −40 to 85° C.

Owing to the arrangement of the temperature sensor 20 in the interior of the container 2, the temperature sensor is protected against external hazards. Owing to the direct contact with the container 2, the temperature sensor 20 is in good thermal contact with the surrounding area since the wall thickness of the container 2 is low. A container 2 composed of metal may be advantageous, in particular, in combination with a temperature sensor 20 since metal exhibits excellent thermal conductivity. Moreover, waste heat is produced by the electronics system 7 which is integrated in the cover 6, as a result of which a temperature measurement in the vicinity of the cover 6 may be corrupted. An arrangement of the temperature sensor 20 on the base 3 of the container 2 is therefore particularly useful since the wall thickness of the container 2 at the base 3 is particularly low and the electronics system 7 and the temperature sensor 20 are at the greatest possible distance. Therefore, precise temperature measurement is rendered possible since the temperature sensor 20 is in good thermal contact with the surrounding area at the base and the temperature measurement is not changed by generation of heat by the electronics system 7.

The temperature sensor 20 may be, for example, an NTC sensor or a PTC sensor. Both types of sensor have a high degree of measurement accuracy and robustness together with a low level of energy consumption. Both types of temperature sensor 20 can be integrated into electrical circuits without problems, and therefore are suitable for use in the ultrasonic transducer 1. In a particularly advantageous embodiment, the piezoelectric disk 5 is used as a temperature sensor 20. Since the piezoelectric disk 5 is composed of a piezoelectric material which is arranged between two electrodes, it forms a capacitance between the electrodes. This capacitance changes depending on the ambient temperature since the piezoelectric material expands in the event of a positive change in temperature and contracts in the event of a negative change in temperature. On the basis of this, the distance between the electrodes, and therefore also the capacitance of the piezoelectric disk 5, is also changed depending on the ambient temperature. Therefore, by way of reading the capacitance of the piezoelectric disk 5, using the electronics system 7 integrated in the cover 6, conclusions can be drawn about the ambient temperature and consequently the distance measurement by the ultrasonic transducer 1 can be corrected on the basis of the ambient temperature.

The container 2 is ideally produced from an electrically conductive material since the electromagnetic compatibility of the ultrasonic transducer 1 is increased in this way. In particular, the piezoelectric disk 5 and the electronics system 7 arranged on the inner side of the cover 6 can be shielded from external electromagnetic interference signals owing to the use of conductive materials in the container 2. A large number of electric motors, which may adversely affect the ultrasonic transducer 1, are often installed in small and also narrow applications, such as drones or autonomous robots for example. Metals such as Al, Cu, Sn, Fe and steel, but also alloys, are appropriate conductive materials for the container 2. The function of the base 3 as a diaphragm requires a relatively high degree of flexibility. On account of this, conductive materials with a low modulus of elasticity, such as Al and Sn, are extremely suitable.

The container 2 can additionally be optimized by way of the inner surface being partially roughened and/or smoothed. Roughening a surface results in materials adhering to this surface more strongly. However, ultrasound is also scattered to a greater extent over a rough, uneven surface. Smoothing the surface reduces adhesion to the surface, but incident ultrasound scatters less. Therefore, it is expedient to roughen the surface of the base 3 adjacent to the piezoelectric disk 5 so that it holds better by means of the adhesive layer 13. Furthermore, the remaining area of the base 3 in the interior of the container 2 is smoothed, so that a damping element 8 does not adhere to these areas and the deflection of the piezoelectric disk 5 is not excessively impeded by the damping element 8. The inner surface of the container 2 can optionally likewise be roughened in order to scatter the ultrasound over this surface to a greater extent. Suitable roughening methods are, for example, a sandblasting or etching process, and grinding or coating processes are suitable for smoothing the surface.

Furthermore, an outer surface of the base 3 can be coated, anodized or lacquered. Firstly, possible irregularities on the surface, which may cause interference in the distance measurement, are eliminated as a result. Secondly, the area can be matched to a possible application since the color or the surface material can be configured to match the surrounding area, so that the ultrasonic transducer 1 does not stand out. It is also possible to anodize the entire outer surface of the container 2. The outer surface of the container 2 is subject to particularly intense environmental influences, such as salt spray from road traffic. Owing to anodization of the outer surface, the container 2 is protected against corrosion.

Anodization of the inner surface of the container 2 may also be desirable in order to shield the container 2 from chemical reactions, for example due to a solvent in the damping element 8 or the adhesive in the adhesive layer 13. For optimum protection, the container 2 can be anodized both on the outer surface and also on the inner surface.

One disadvantage of anodization of the inner surface of the container 2 is that electrical contact can no longer be made with the container 2 and therefore said container can no longer be readily used for electrical connection, for example to a reference potential such as ground. Therefore, it is advantageous to additionally apply a conductive layer to the inner surface of the container 2.

As an alternative or in addition to this, the anodized inner surface of the container 2 can comprise specific apertures in the anodization in at least one point. In other words, apertures in the electrically non-conductive anodization layer of the inner surface can be provided in a targeted manner. These apertures can render possible an electrically conductive contact-connection with the container 2. For example, electrical contact can be made with the container 2 by way of an additionally applied conductive layer via the at least one aperture. As an alternative, electrical contact can be made with the container 2 via a solder contact made in the aperture.

By way of introducing an additional conductive layer, the specific aperture in the anodization or a combination thereof, electrical connection of installed electronic components, such as the piezoelectric disk 5, the temperature sensor 20 or the electronics system 7, to a reference potential can be carried out and the electromagnetic compatibility of the ultrasonic transducer 1 and the electromagnetic shielding of the electronics system 7 in the container 2 can be achieved similarly as well or equally as well as in the case of a container 2 that is not anodized on the inner surfaces.

Figure 5:
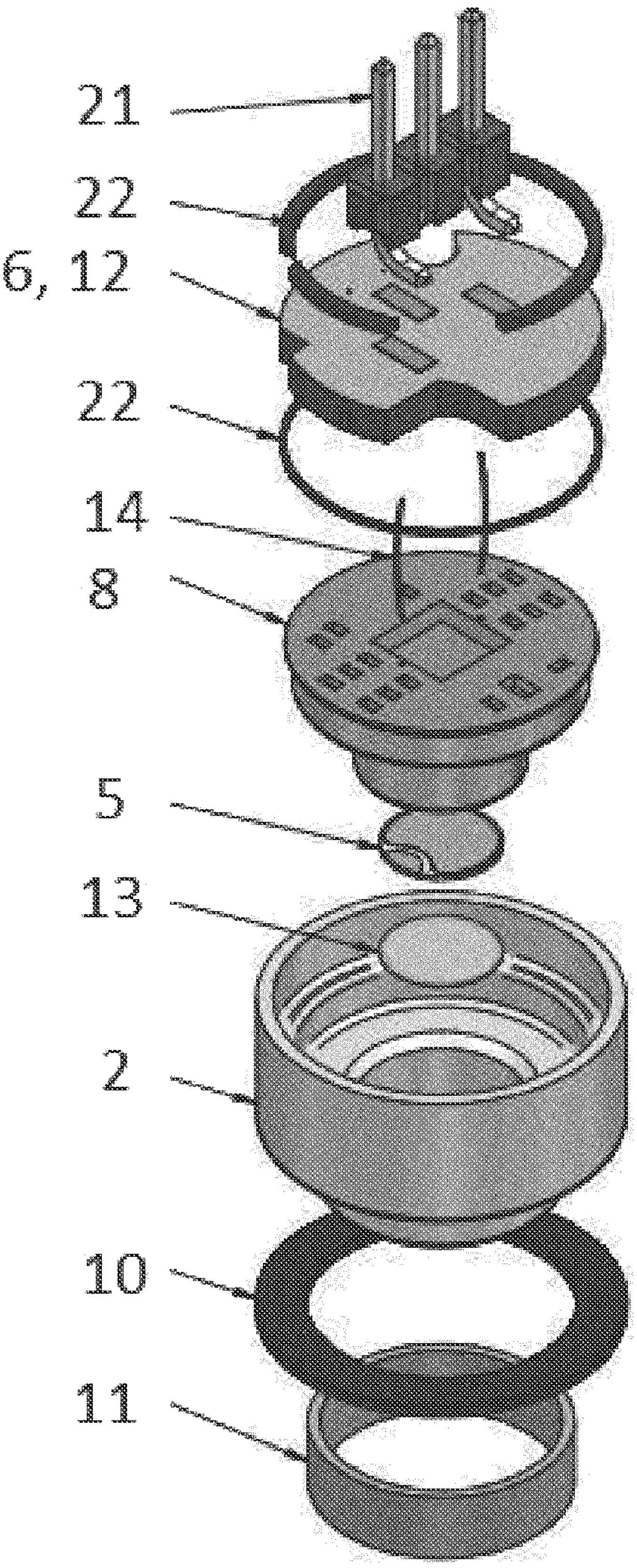
FIG. 5 shows an exploded view of a further embodiment of an ultrasonic transducer.

FIG. 5 shows an exploded view of a further embodiment of the ultrasonic transducer 1, similarly to the exploded view shown in FIG. 1. In contrast to FIG. 1, the cover 6 is arranged between two silicone rings 22 in this embodiment. The silicone rings 22 serve primarily to mechanically decouple the cover 6 from the container 2, but also as a seal in order to prevent a potting compound from entering the interior of the container 2. The damping element 8 has, on a surface that faces the cover 6, recesses in which the electronics system 7, which protrudes out of the cover 6, can be accommodated. In this embodiment, three pins 21 are provided as the electrical connection for the ultrasonic transducer.

Figure 6:
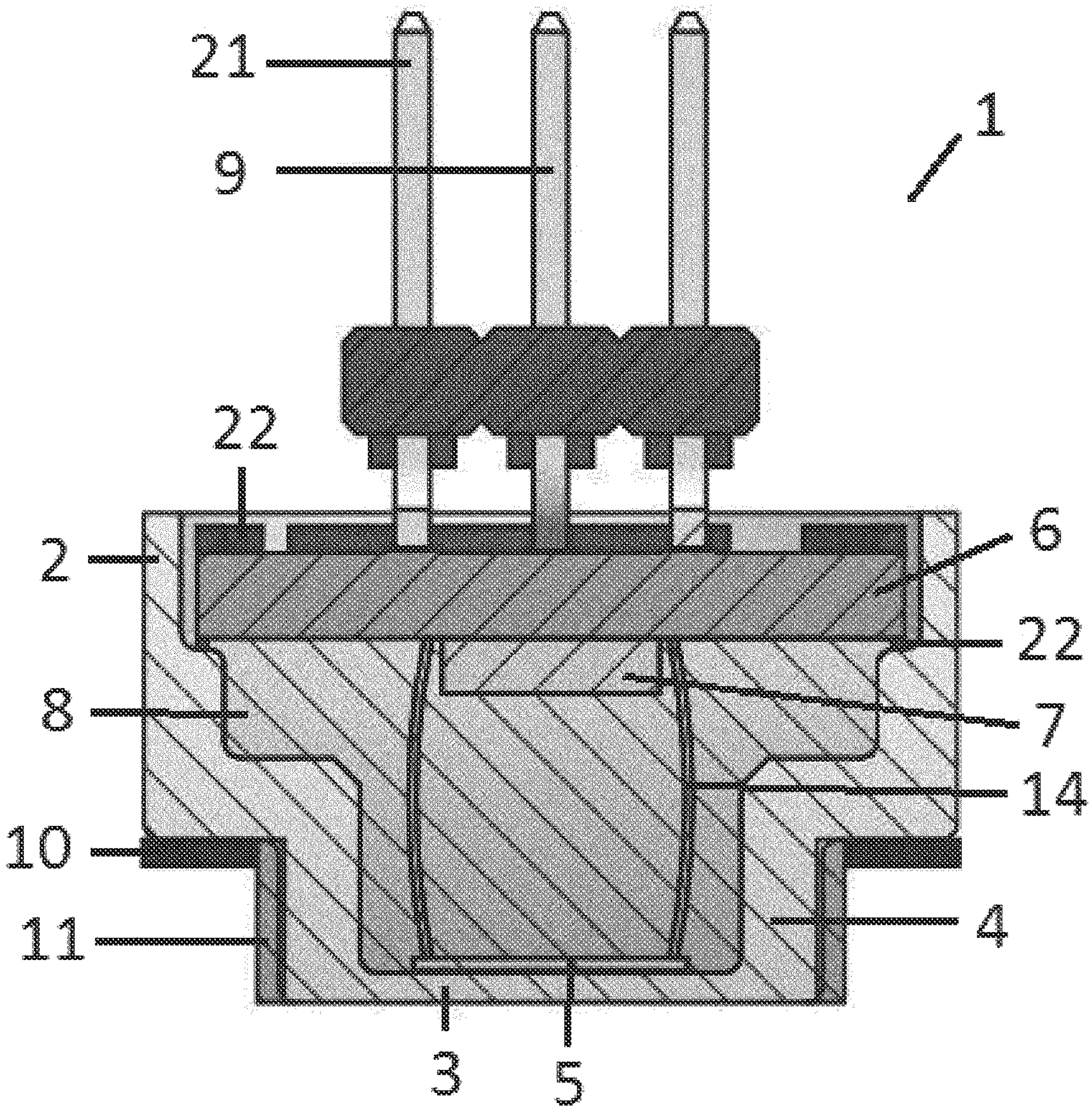
FIG. 6 shows a cross section through a further embodiment of an assembled ultrasonic transducer.

FIG. 6 shows a cross section through the embodiment of the ultrasonic transducer 1 shown in FIG. 5, wherein the illustration is similar to the illustration of FIG. 3. The shape of the container 2 corresponds to the shape of the container 2 from FIG. 4. The cover 6 is arranged at a distance from the opening of the container 2 and therefore in the container 2. In this way, the electronics system 7 is protected against mechanical and electromagnetic loads in the cover 6. A potting compound can be introduced into the intermediate space between the cover 6, the opening and the wall of the container 2, said potting compound fixing the cover 6 in a vibration-damping manner in the container 2 and providing protection. Owing to the silicone ring 22 between the cover 6 and the damping element 8, the potting compound is not in direct contact with the damping element 8.

Figure 7:
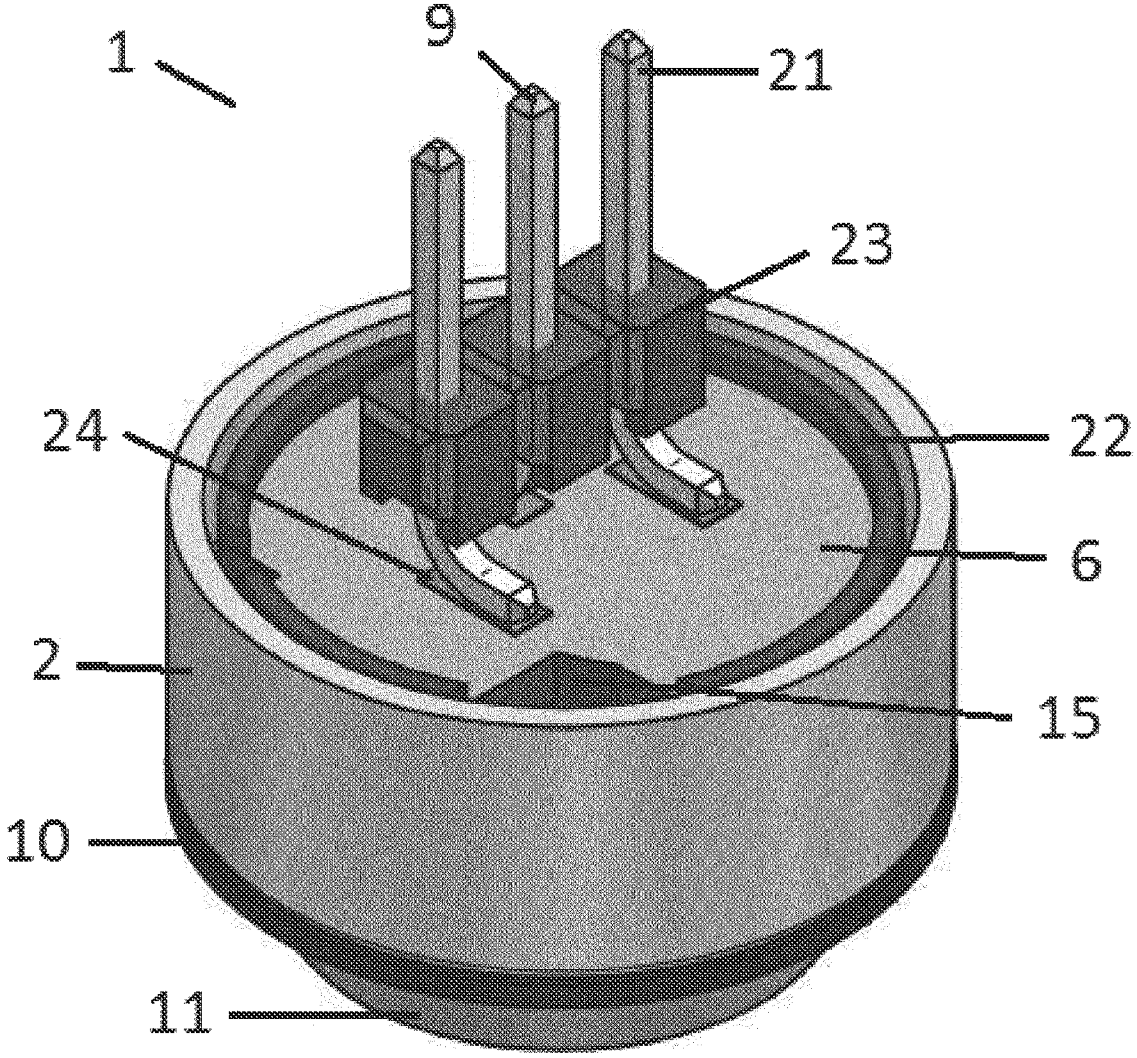
FIG. 7 shows a perspective view of an assembled ultrasonic transducer.

FIG. 7 shows a perspective view of the embodiment of the ultrasonic transducer 1 shown in FIG. 5 and FIG. 6. The three pins 21 are rigidly connected to one another by way of a connecting piece 23. The pins 21 are each bent at an end that rests on the cover 6 and are arranged such that they provide a stable stand in the form of a tripod. Each of the three pins 21 is situated on an electrically conductive contact area 24 which can be considered to be part of the electronics system 7 in the cover 6. The three pins 21 can respectively be used as a connection for the supply voltage, as a connection to a reference potential or as an I/O connection 9. Since the cover 6 is at a distance from the opening of the container 2, a potting compound applied to the cover 6 can be used for fixing the pins 21 on the cover 6. The three pins 21 are designed such that they can be simultaneously used as an electronic connection and for mechanically fastening the ultrasonic transducer.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. An ultrasonic transducer comprising:

a container having an opening, a base and a wall;

a piezoelectric disk arranged within the container on the base; and a cover closing the container, wherein the cover comprises an electronics system integrated in the cover, the cover being a printed circuit board, wherein the electronics system is in electrical contact with the piezoelectric disk and is configured to control and to read the piezoelectric disk, wherein the piezoelectric disk and the electronics system are arranged in an interior of the container, wherein the container consists of an electronically conductive material, wherein the container is a Faraday cage shielding the piezoelectric disk and the electronics system from external interference signals, wherein an area of the container that runs parallel to the base and does not overlap with the base has a greater wall thickness than a base area adjacent to the piezoelectric disk, and wherein the wall thickness is more than three times a thickness of the base area and no more than ten times the thickness of the base area.

2. The ultrasonic transducer according to claim 1, further comprising a damping element arranged between the base and the cover, wherein the damping element fills the container.

3. The ultrasonic transducer according to claim 1, wherein the cover is fixed by way of a re-closeable fastening mechanism.

4. The ultrasonic transducer according to claim 1, wherein the cover is arranged in the container at a distance from the opening of the container.

5. The ultrasonic transducer according to claim 1, wherein the cover comprises at least two recesses.

6. The ultrasonic transducer according to claim 5, wherein a passage for a wire is formed at least in one of the recesses, and wherein the piezoelectric disk is electrically connected to the electronics system by the wire.

7. The ultrasonic transducer according to claim 1, wherein the container comprises a step along the opening in the wall.

8. The ultrasonic transducer according to claim 1, wherein the electronics system comprises a digital I/O interface on an outer side of the cover.

9. The ultrasonic transducer according to claim 1, wherein the electronics system comprises pins on an outer side of the cover.

10. The ultrasonic transducer according to claim 1, wherein the base is thinner than 1 mm.

11. The ultrasonic transducer according to claim 1, wherein a thickness of the wall is at least 1.5 times the thickness of the base.

12. The ultrasonic transducer according to claim 1, wherein an inner surface of the container is partially roughened and/or smoothed.

13. The ultrasonic transducer according to claim 1, wherein the container is anodized.

14. The ultrasonic transducer according to claim 1, wherein an inner surface of the container is anodized and an outer surface is untreated, or wherein the inner surface of the container and the outer surface of the container are anodized, or wherein the outer surface of the container is anodized and the inner surface is untreated.

15. The ultrasonic transducer according to claim 14, wherein the inner surface of the container comprises an anodization layer, and wherein the anodization layer comprises an aperture.

16. The ultrasonic transducer according to claim 15, wherein an electrical connection from the piezoelectric disk and/or the electronics system to a reference potential is formed via the aperture.

17. The ultrasonic transducer according to claim 1, wherein an inner surface of the container comprises a conductive layer.

18. The ultrasonic transducer according to claim 1, wherein the container comprises an adhesive material on an outer surface of the area that has a greater wall thickness.

19. The ultrasonic transducer according to claim 1, further comprising vibration-damping components arranged on an outer surface of the container.

20. The ultrasonic transducer according to claim 1, wherein the printed circuit board is flexible.

21. The ultrasonic transducer according to claim 1, wherein the printed circuit board is potted in a plastic compound.

22. The ultrasonic transducer according to claim 1,
wherein the printed circuit board comprises electrical components, and
wherein the electrical components are arranged on an area of the printed circuit board that faces the piezoelectric disk.

23. The ultrasonic transducer according to claim 1, wherein the printed circuit board comprises an integrated circuit with a charge pump.

24. The ultrasonic transducer according to claim 1,
wherein the printed circuit board comprises an analog ground line and a digital ground line, and
wherein the analog ground line and the digital ground line are configured such that electromagnetic interaction between the digital ground line and the analog ground line is suppressed.

25. The ultrasonic transducer according to claim 24, wherein the analog ground line and the digital ground line are arranged on opposite sides of an integrated circuit.

26. The ultrasonic transducer according to claim 1, wherein the piezoelectric disk is a temperature sensor.

27. The ultrasonic transducer according to claim 26, wherein the ultrasonic transducer is configured to compensate for a temperature dependence of measured distances on account of the temperature dependence of a speed of sound on basis of measurement values from the temperature sensor.

28. The ultrasonic transducer according to claim 1, wherein the ultrasonic transducer comprises a temperature sensor.

29. The ultrasonic transducer according to claim 28, wherein the temperature sensor comprises an NTC sensor or a PTC sensor.

30. The ultrasonic transducer according to claim 28, wherein the temperature sensor is arranged in the interior of the container.

31. The ultrasonic transducer according to claim 1, wherein the container is produced by an impact extrusion process.

32. The ultrasonic transducer according to claim 1,
wherein the piezoelectric disk is a temperature sensor,
wherein the piezoelectric disk consists of a piezoelectric material, which is arranged between two electrodes, and thereby forms a capacitance,
wherein the piezoelectric material is configured to expand or contract depending on an ambient temperature, and
wherein the electronics system is in electrical contact with the piezoelectric disk and is configured to control and to read the piezoelectric disk.

33. The ultrasonic transducer according to claim 1,
wherein the piezoelectric disk consists of a piezoelectric material, which is arranged between two electrodes, and thereby forms a capacitance,
wherein the electronics system contacts the piezoelectric disk via two wires, each of the two wires being soldered to the electronics system, and
wherein the electronics system is in electrical contact with the piezoelectric disk and is configured to control and to read the piezoelectric disk.

34. A device comprising:
the ultrasonic transducer according to claim 1,
wherein the device is configured to measure a distance of the device from an object on basis of a signal ascertained by the ultrasonic transducer.

35. A method for producing an ultrasonic transducer, the method comprising:
producing a container having an opening, a base and a wall;
fastening a piezoelectric disk on the base of the container; and
closing the container with a cover that comprises an electronics system that is integrated into the cover, wherein the cover is a printed circuit board,
wherein the electronics system is in electrical contact with the piezoelectric disk and is configured to control and to read the piezoelectric disk,
wherein the piezoelectric disk and the electronics system are arranged in an interior of the container,
wherein the container consists of an electronically conductive material,
wherein the container is a Faraday cage shielding the piezoelectric disk and the electronic system from external interference signals,
wherein an area of the container that runs parallel to the base and does not overlap with the base has a greater wall thickness than a base area adjacent to the piezoelectric disk, and
wherein the wall thickness is more than three times a thickness of the base area and no more than ten times the thickness of the base area.

36. The method according to claim 35, wherein the container is produced by an impact extrusion process.

37. The method according to claim 35, further comprising, before closing the container, arranging a first silicone ring on a bearing area of the container facing away from the base, wherein closing the container comprises arranging the cover on the first silicone ring.

38. The method according to claim 37, further comprising arranging a second silicone ring on a side of the cover facing away from the base, wherein the cover is fixed between the first and second silicone rings.

39. The method according to claim 37, wherein the electronics system contacts the piezoelectric disk via a wire which is soldered to the electronics system.

40. The method according to claim 39, wherein the cover comprises at least one recess in which the wire is arranged, and wherein closing the container comprises pushing the cover onto the container with a translational movement and subsequently soldering the wire to the electronics system.

41. The method according to claim 35, further comprising filling a cavity between the cover and the base with a liquid filler material, and curing the liquid filler material to form a damping element.

42. An ultrasonic transducer comprising:
a container having an opening, a base and a wall;
a piezoelectric disk arranged via an adhesive directly on the base of the container; and
a cover closing the container,
wherein the cover comprises an electronics system that is integrated in the cover, the cover being a printed circuit board,
wherein the electronics system is in electrical contact with the piezoelectric disk and is configured to control and to read the piezoelectric disk,
wherein the piezoelectric disk and the electronics system are arranged in an interior of the container,
wherein the container consists of an electronically conductive material,
wherein the container is a Faraday cage shielding the piezoelectric disk and the electronics system from external interference signals, wherein an area of the container that runs parallel to the base and does not overlap with the base has a greater wall thickness than a base area adjacent to the piezoelectric disk, and wherein a wall thickness is more than three times a thickness of the base area and no more than ten times the thickness of the base area.

43. An ultrasonic transducer comprising:

a container having an opening, a base and a wall;

a piezoelectric disk arranged within the container on the base; and a cover closing the container, wherein the cover comprises an electronics system integrated in the cover, wherein the electronics system is arranged on an inside of the cover, wherein the electronics system is in electrical contact with the piezoelectric disk and is configured to control and to read the piezoelectric disk, wherein the piezoelectric disk and the electronics system are arranged in an interior of the container, wherein the container consists of an electronically conductive material, wherein the container is a Faraday cage shielding the piezoelectric disk and the electronics system from external interference signals, wherein an area of the container that runs parallel to the base and does not overlap with the base has a greater wall thickness than a base area adjacent to the piezoelectric disk, and wherein a wall thickness is more than three times a thickness of the base area and no more than ten times the thickness of the base area.

* * * * *